United States Patent
Bansbach

[11] 3,710,867
[45] Jan. 13, 1971

[54] APPARATUS AND PROCESS FOR ADDING CHEMICALS

[75] Inventor: Paul L. Bansbach, St. Louis, Mo.
[73] Assignee: Petrolite Corporation, Wilmington, Del.
[22] Filed: Jan. 13, 1971
[21] Appl. No.: 106,171

[52] U.S. Cl. ..........................166/244 C, 166/75
[51] Int. Cl. ....................E21b 43/00, E21b 33/03
[58] Field of Search ........................166/75, 244 C

[56] References Cited

UNITED STATES PATENTS

| | | | |
|---|---|---|---|
| 3,211,225 | 10/1965 | Thiessen et al. | 166/75 |
| 1,700,996 | 7/1929 | Bushnell | 166/244 C |
| 1,923,098 | 8/1933 | Knight et al. | 166/75 |
| 2,884,067 | 4/1959 | Marken | 166/75 |
| 3,053,320 | 9/1962 | Steincamp | 166/75 |
| 3,228,472 | 1/1966 | Rhoads, Jr. | 166/75 |

Primary Examiner—James N. Leppink
Attorney—Sidney B. Ring

[57] ABSTRACT

An apparatus and process for adding chemicals, such as well treating chemicals, etc., to a system, such as an oil well, which comprises:
1. a chemical inlet valve capable of connection to a chemical reservoir;
2. a container connected to (1) for holding a measured amount of chemical;
3. a chemical discharge valve for (2); (1), (2) and (3) being in gravity relationship;
4. a fluid inlet valve connected to a fluid flow line, such as a by-pass line which, is connected to a flow line, such as from an oil well, and connected to (3), and an exit flow line therefrom;
5. a timer which synchronizes the operation of said valves so that a measured amount of chemical enters the system and is flushed by fluids through the by-pass line of (4) into the system such as a well.

The apparatus and process can also be adapted to other systems where automatic addition of chemicals is required.

5 Claims, 1 Drawing Figure

DEVICE & PROCESS FOR DOWNHOLE CHEMICAL TREATMENT

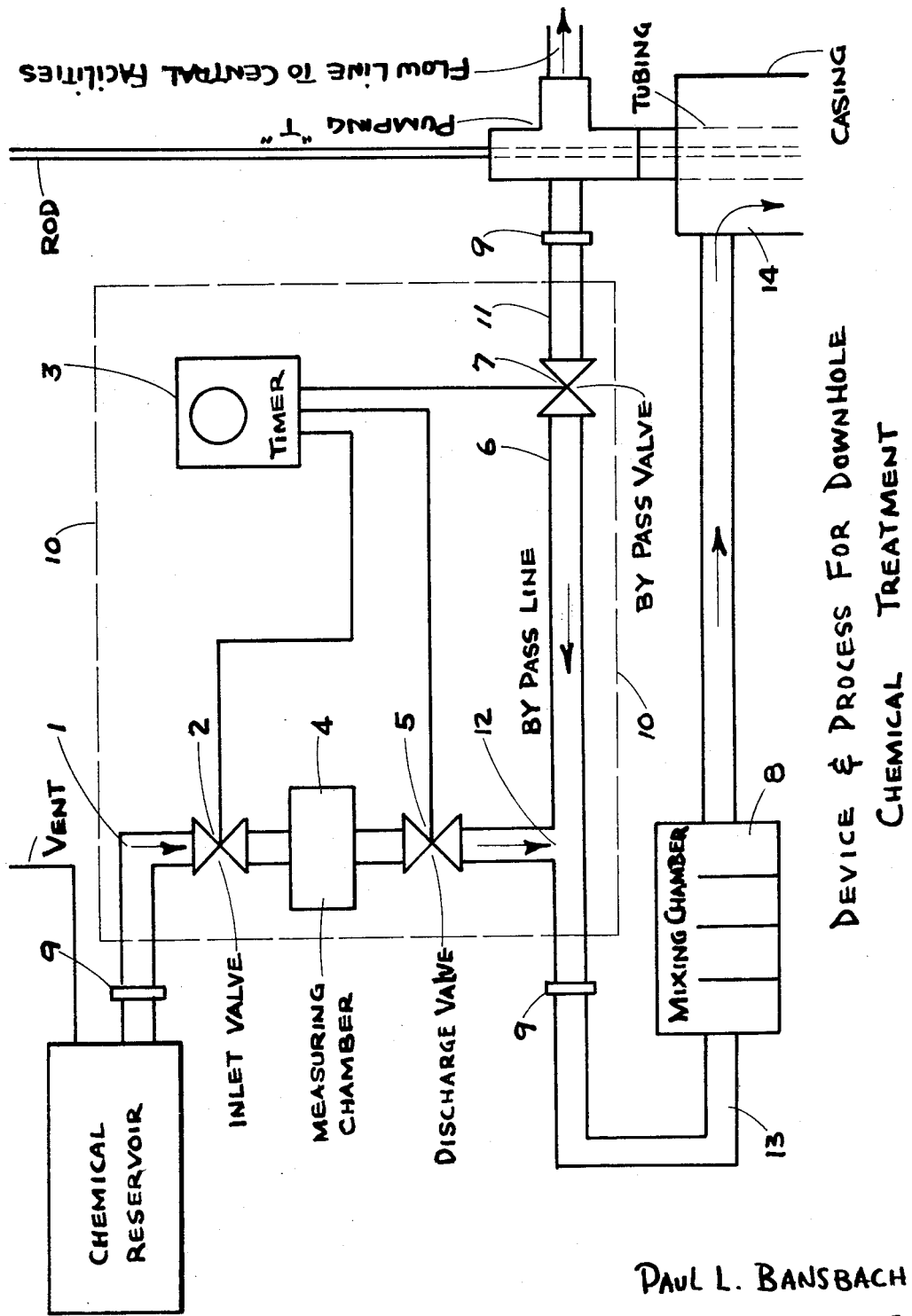

APPARATUS AND PROCESS FOR ADDING CHEMICALS

Oil production requires the addition of various chemicals to the well, for example, corrosion inhibitors, scale preventives, paraffin deposit inhibitors, demulsifiers, wetting agents, bactericides, etc.

In the operation of an oil well, it is important to minimize costs by (1) maximizing the effectiveness of these chemicals, and (2) making the addition of these chemicals as automatic as possible so as to reduce labor costs. Moreover, and particularly in the case of a small operation, it is important that the device be as automatic, as inexpensive and as simple as possible.

I have now invented a process which both maximizes the effectiveness of these chemicals and makes their addition as automatic as possible. It can operate without a human operator and automatically introduces a measured amount of chemical into the system, such as into the oil well casing. This is effected by a timing device which synchronizes the chemical inlet valve, the chemical discharge valve, and the well fluid inlet or by-pass valve so that a measured amount of chemical can be automatically mixed with well fluids and then flushed into the casing of the well.

The system does not require pumps or other driving force. Rather, it relies on the natural forces of the system, such as gravity and the pressure of fluids produced by the oil well.

This new device and process which is particularly designed to automatically add chemicals to the well casing and to provide adequate treatment with low cost installation and maintenance can be described as follows: Chemical is gravity fed from a chemical reservoir into inlet line 1, through an automatically operated inlet valve 2 which is controlled by a timer 3 into a fixed size chemical measuring chamber 4, the container size depending on quantity of chemical to be added per treatment. This automatic inlet valve is programmed to remain open long enough to allow the container to fill, then closed. After the inlet valve closes, an automatically operated discharge valve 5, also controlled by the timer 3 and located on the bottom or discharge side of the chemical measuring chamber, opens and allows the chemical in the measuring chamber to gravity feed into a circulating or by-pass line running from the well tubing or flow line at the wellhead through 11, valve 7, bypass line 6, "T" 12, line 13, mixing chamber 8 and then into the casing of the well 14. This automatic discharge valve 5 is programmed to remain open long enough to allow the contents of the chemical measuring container to gravity feed into the by-pass line through "T" 12 and then closed. After this discharge valve closes, another automatically operated by-pass valve 7, controlled by the timer 3 and located in the by-pass line 11 and near the well head pumping "T," opens and allows produced fluids from the tubing or flow line of the well to circulate through the by-pass line 6 and flush the chemical into the casing 14 and downhole. The automatic by-pass valve is programmed to remain open, for sufficient time for the proper amount of flush fluid to be circulated and then closed.

It may be desirable to install some type of optional mixing chamber 8 in the by-pass line between the point where the chemical enters the by-pass line from the chemical measuring container and the casing. This mixing chamber provides dilution and mixing of the chemical with the circulating well flush fluids before going downhole. If desired, it can be omitted.

The automatic valves may be any type which can be actuated by a timer. Typically they would be solenoid, electric or gas-motor driven or gas actuated valves, although there are others which would be suitable. The timer must be capable of actuating each of the three valves independently of the others. The timer also must cover a time range to satisfy the treating frequency. Treating frequency will typically be once per day, week or month but may be more or less frequent than this. Quantity of chemical per treatment can be changed by changing the size of the chemical measuring container.

In carrying out the invention it is convenient to prefabricate an apparatus unit enclosed within the dotted lines 10 which can be set up in any convenient location and connected to the system by any convenient means, such as pipe unions 9 to (1) the chemical reservoir, (2) to the fluids of the producing well, and (3) to the well casing.

The following working example is presented for purposes of illustration and not of limitation.

EXAMPLE

A treating device or apparatus was made as follows: A ¾ inch pipe was used for the chemical inlet line 1 and was connected to ¾ inch Jamesbury chemical inlet ball valve 2 fitted with a Jamesbury electric operator (not shown). Below this valve and on the opposite side from the chemical inlet line was connected a chemical measuring chamber 4 made from two 3" × ¾" pipe reducers and a 3" × 4" pipe nipple. This chamber had a volume of 0.3 gallon. On the bottom side of this measuring chamber was connected a ¾ inch Jamesbury chemical outlet ball valve 5 fitted with a Jamesbury electric operator (not shown). The opposite side of this valve was connected by a pipe "T" 12 and to a 1¼ inches by-pass line 6. On one side of this "T" in the 1¼ inches pipe was connected a 1¼ inches Jamesbury by-pass ball valve 7 fitted with a Jamesbury electric operator (not shown). The three Jamesbury electric valve operators were connected to an Eagle Multipulse Timer fitted with three cams 3 capable of operating the three valves. This treating device is represented within the area of dotted line 10. In practice this treating device is a rectangular box totally enclosed.

This device was attached to a pumping oil well in West Texas as follows. A drum of treating chemical employed as a chemical reservoir was mounted above the chemical inlet line 1 and attached to it at 9 with a 1 inch flexible hose. The chemical drum or reservoir was fitted with a sight glass to readily determine changes in the liquid level in the drum. The open side of the 1¼ inches Jamesbury ball valve 7 was attached at 9 through a 1¼" × 1" bushing and 1 inch pipe 11 to the 1 inch connection on the side of the oil well's pumping "T." (This pumping "T" has a 2 inch connection on the side opposite the 1 inch connection to which is connected the flow line which carries the well's production to central facilities). The side of the 1¼ inches "T" 12 opposite from that to which is connected the 1¼ inches Jamesbury by-pass ball valve 7 is connected at 9 to a 1¼" × 1" bushing and 1 inch pipe 13 to one side of the well casing 14. The Eagle Multipulse Timer 3 was connected to a 110V electrical outlet provided at the well site.

The device was programmed by adjusting the cams in the Eagle Multipulse Timer 3 to function as follows. All valves are closed at the start. The timer 3 actuated the electrical operator on the chemical inlet valve 2 to open the valve. Chemical from the chemical drum or reservoir gravity fed through the chemical inlet line 1 and the chemical inlet valve 2 and displaced the air in the chemical measuring chamber 4 until it was full. The air thus displaced from the chemical measuring chamber 4 flowed back through the chemical inlet valve 2 and the chemical inlet line 1 and into the chemical drum or reservoir. Thirty minutes after the chemical inlet valve 2 opened, the timer 3 actuated the electrical operator to close the chemical inlet valve 2. Thirty minutes after the chemical inlet valve 2 closed, the timer 3 actuated the electrical operator on the chemical outlet valve 5 to open the valve. Chemical in the chemical measuring chamber 4 gravity fed through the chemical outlet valve 5 and into the by-pass line 13 which is connected to the well casing 14. Gas from the casing 14 flows back through the by-pass line 11 and the chemical outlet or discharge 5 valve and replaces the chemical which has gravity flowed out of the chemical measuring chamber 4. Thirty minutes after the chemical outlet valve 5 opened, the timer 3 actuated the electrical operator to close the chemical outlet valve 5. Thirty minutes after the chemical outlet valve 5 closed, the timer 3 actuated the electrical operator on the by-pass valve 7 to open the valve. Part of the well production which normally flows from the 2 inches flow line to the central facilities now diverts through the 1 inch line on the opposite side of the pumping "T" and flows through the by-pass line 6, the by-pass valve 7, and the 1 inch pipe 13 into the well casing 14 and flushes the chemical which has previously entered the casing from the chemical measuring container 4 down the well to the bottom. In the bottom of the well the chemical is picked up in the incoming fresh fluids and pumped up the tubing through the flow line and to central facilities. The chemical is therefore allowed to come in contact with all internal metal surfaces inside the producing system and provide the necessary protection. One hour after the by-pass valve 7 opened, the timer 3 actuated the electrical operator to close the by-pass valve 7. Twenty-four hours after the chemical inlet valve 2 opened, the timer 3 actuated the electrical operator to again open this chemical inlet valve 2 and the whole cycle is repeated. It continues to repeat every 24 hours. Total chemical injected is about 2 gallons per week. The site glass on the chemical drum confirms that the correct amount of chemical is flowing from the drum.

The above example employed a corrosion inhibitor. Normal control procedures indicate that the well is being properly protected from corrosion. Specifically, weighed metal test coupons inserted in the flow line near the wellhead show only a minimal metal loss due to corrosion.

Prior treatment of this well for corrosion had been accomplished using a treating truck. The operator of the treating truck drives to the well, attaches a flexible hose to the well casing, injects the specified quantity of chemical and flush fluid from a tank on the truck, disconnects his hose from the casing, opens a valve to start production circulating from the flow line back down the casing, and leaves. At some later time it is necessary to return to the well and manually change the well from circulating to again producing through the flow line to central facilities.

Similar results are obtained by employing a demulsifier in the system as well as other chemical treating agents.

Non-limiting examples of suitable well treating agents can be found in the following patents and publications:

1. O/W Demulsifiers: 2,470,829, 2,589,198, 2,589,199, 2,589,200, 2,589,201, Re. 22,963,
2. W/O Demulsifiers: 2,499,365, 2,499,366, 2,562,878, 2,549,434, 2,549,435, 2,549,436, 2,549,437, 2,028,266, 2,028,267, 2,028,269, 2,552,528, 2,154,423,
3. Corrosion inhibitors: 2,466,517, 2,466,530, 2,598,213, 2,781,352, 2,828,259, Re. 23,227,
4. Scale preventives: 2,589,195,
5. Bactericides: 2,917,428, 2,912,324, 2,906,708, 2,867,279, 2,839,467, 2,802,785, 2,801,216, 2,733,206,
6. Reagents employed in enhancing primary and secondary recovery: 2,369,831, 2,606,871, 2,633,919, 2,419,755, Chemicals disclosed in "Oil and Gas Journal" 50, No. 14, 97–8 (1951), "Producers Monthly" 16, No. 1, 24–30 (1951),
7. Paraffin removers: 2,470,831, 2,817,635, 2,818,079, 2,836,559, 2,873,253.

As is quite evident, many well treating chemicals are known and will be constantly developed. It is, therefore, not only impossible to attempt a comprehensive catalogue of such compositions, but to attempt to describe the invention in its broader aspects in terms of specific chemical names of well treating chemicals used would be too voluminous and unnecessary since one skilled in the art could select the proper agent. This invention lies in the use of well treating chemicals in carrying out this invention.

Non-limiting well treating compositions are illustrated below:

COMPOSITION

| Example | Patent Example |
|---|---|
| | O/W demulsifiers |
| 1 | 2,470,829 Example 1. |
| 2 | 2,589,198 Example column 13, lines 1–13. |
| 3 | 2,589,199 Column 12, reaction product Example 2. |
| 4 | 2,589,200 Column 12, reaction product Example 1. |
| 5 | 2,589,201 Column 19 demulsifier Example 1. |
| | W/O demulsifiers |
| 6 | 2,499,365 Example 1c (Column 136). |
| 7 | 2,499,366 Example 2c (Column 44). |
| 8 | 2,562,878 Example 39. |
| 9 | 2,549,434 Example 3. |
| 10 | 2,549,435 Example 1. |
| 11 | 2,549,436 Example 2. |
| 12 | 2,549,437 Example 1. |
| | Corrosion inhibitors |
| 13 | 2,466,517 Column 5, Example 8. |
| 14 | 2,466,530 Example 1. |
| 15 | 2,508,213 Example 1. |
| 16 | 2,781,352 Example 2c. |

| | | |
|---|---|---|
| 17 | 2,828,259 Example 2. | |

Scale preventive

| | | |
|---|---|---|
| 18 | 2,589,195 Example 1. | |

Bactericides

| | | |
|---|---|---|
| 19 | 2,917,428 "Duomeen" C methyl chloride quaternary. | |
| 20 | 2,867,279 Composition III. | |
| 21 | 2,839,467 Example (b). | |
| 22 | 2,802,785 Example 1. | |
| 23 | 2,801,216 Glyoxal. | |
| 24 | 2,733,206 Dicoco-dimethylammonium chloride. Primary and secondary recover. | |
| 25 | 2,369,831 Composition column 2, lines 52–60. | |
| 26 | 2,606,871 Rosin amines acetate. | |
| 27 | 2,638,919 Silicones. | |

Paraffin removers

| | | |
|---|---|---|
| 28 | 2,470,831 Example 10. | |
| 29 | 2,836,559 (50:50 mixture) kerosene; 20 units polyoxyethylene sorbitan tri-tall oil. | |
| 30 | 2,837,253 Table 1A, derivative 1. | |

It is noted that the process and apparatus adds the well treating chemical downhole as compared to the tubing.

There are several advantages to adding demulsifiers downhole. (1) The chemical is present in the fluids before much of the emulsification takes place and therefore reduces the stability of emulsions formed in subsurface and wellhead producing equipment. (2) Chemical can counteract the effect of emulsifier before it has time to concentrate at the interface. (3) Full advantage can be derived from the high bottom hole temperature to destabilize emulsions. (4) The considerable agitation occurring in the tubing can be utilized to aid the chemical action.

Corrosion and scale inhibitors when added downhole are able to control corrosion and scale deposition in all subsurface as well as surface equipment.

Paraffin control chemicals added downhole either prevent growth of paraffin crystals or remove downhole deposits which may have formed.

Having thus described my invention what I claim as new and desire to obtain by Letters Patent is

1. An oil well treating apparatus relying on gravity and the pressure of fluids produced by the oil well without requiring pumps or other driving forces for adding to the oil well chemicals such as corrosion inhibitors, scale preventives, paraffin deposit inhibitors, demulsifiers, wetting agents, bactericides and the like, comprising, in combination,
   1. a chemical inlet valve,
   2. a chemical measuring container operatively connected to said chemical inlet valve for holding a measured amount of chemical, said chemical inlet valve and said chemical measuring chamber being positioned with respect to each other so as to allow the chemical to pass from and through said chemical inlet valve to said chemical measuring chamber by gravity flow,
   3. a chemical discharge valve operatively connected to said chemical measuring container, said chemical discharge valve being positioned with respect to said chemical inlet valve and said chemical measuring chamber so as to allow the chemical to pass from said chemical measuring chamber to said chemical discharge valve by gravity flow,
   4. an exit flow line means operatively connected to said chemical discharge valve for receiving said chemical passing through and from said chemical discharge valve,
   5. a fluid flow line means for receiving well fluid from the well and said chemical from said exit flow line means, said fluid flow line means being operatively connected to said exit flow line means,
   6. a fluid inlet valve operatively connected to said fluid flow line means, and
   7. timer means operatively connected to said valves for automatically synchronizing the operation of said valves whereby a measured amount of said chemical enters the well through said exit flow line means and circulates through said well, said fluid inlet valve, said fluid flow line means and said exit flow line means for a predetermined time period.

2. The apparatus of claim 1 wherein said timer means includes programming means for automatically opening and closing each of said valves at predetermined times independently of each other.

3. The apparatus of claim 1 wherein said chemical measuring container is a fixed size chemical measuring container.

4. The apparatus of claim 1 wherein said exit flow line means is positioned with respect to said chemical discharge valve so as to allow said chemical to pass from said discharge valve to said exit flow line means by gravity flow.

5. A process for treating an oil well with an oil well chemical such as corrosion inhibitors, scale preventives, paraffin deposit inhibitors, demulsifiers, wetting agents, bactericides and the like, comprising, in combination, passing a predetermined amount of said chemical from its reservoir by gravity flow through an automatically operated open chemical inlet valve to a chemical measuring container, automatically closing said chemical inlet valve after a predetermined amount of said chemical has reached said container, then passing by gravity flow said predetermine amount of said chemical from said container through an automatically operated open chemical discharge valve through an exit flow line into the well and to an automatically closed by-pass fluid flow line operatively connected to said exit flow line, said automatically closed by-pass fluid line having positioned therein an automatically operated fluid inlet valve operatively connected to the oil well, then automatically closing said chemical discharge valve, then automatically opening said fluid inlet valve, thereby opening said by-pass fluid line, and then allowing the well fluids to cause the circulation of said chemical through said well through said fluid inlet valve, said by-pass fluid line, said exit fluid line and said well without any pumps or other driving forces for a predetermined time, thereby automatically synchronizing the operation of said valves to allow a measured amount of said chemical to enter and circulate through said well for said predetermined time.

* * * * *